Aug. 25, 1931.  S. W. BORDEN  1,820,214
METER FOR MEASURING GROUND RESISTANCE
Filed March 18, 1929
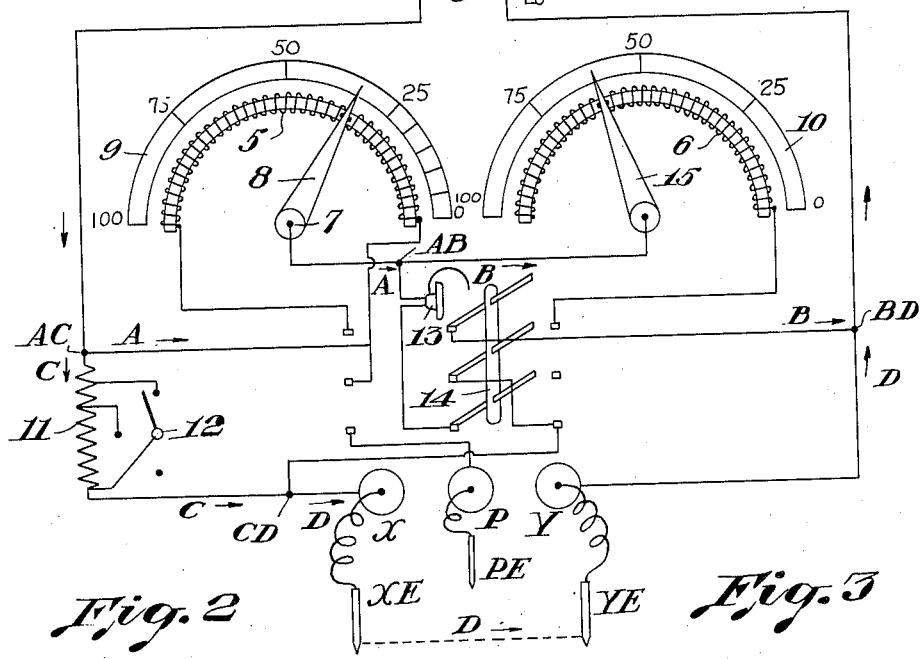
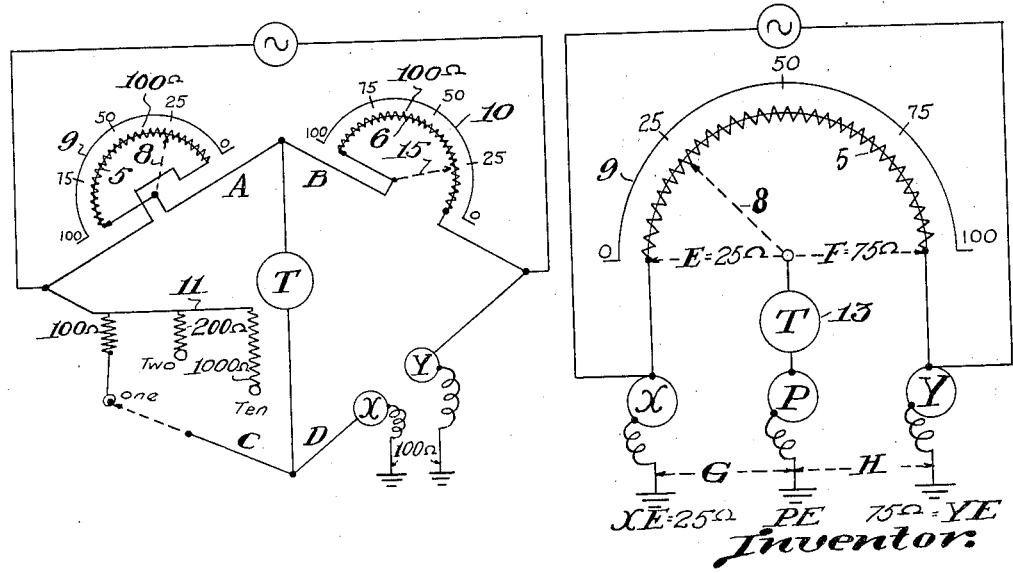
Inventor:
Stephen W. Borden Patented Aug. 25, 1931

1,820,214

UNITED STATES PATENT OFFICE

STEPHEN W. BORDEN, OF SUMMIT, NEW JERSEY

METER FOR MEASURING GROUND RESISTANCE

Application filed March 18, 1929. Serial No. 347,780.

This invention relates to improvements in electrical measuring instruments and more particularly to that class of instruments which are used for measuring the resistance value of the surrounding earth through which a current must travel in passing from an earth electrode into and through the adjacent earth to the earth generally.

The object of the invention is to provide a light, compact, self-contained, portable and rugged meter and one which may be constructed without any delicate moving parts. A further object of the invention is to provide a meter which will indicate by means of a pointer and scale, the resistance of the earth electrode which it is desired to measure, the indication being direct and involving no calculation other than the use of a multiplier.

In the preferred form of my meter I obtain the current for the operation of the meter from the secondary of an induction coil the primary of which is connected through an interrupter to a battery of one or more dry cells, but it is to be understood that other sources of energy such as a hand-driven generator, a microphone hummer or even an outside source of current may be employed and that the current may have practically any characteristics such as direct, alternating or pulsating so long as a suitable detector is used.

The drawings are schematic only and are intended to show the component parts and their arrangement (electrically) with respect to each other. Fig. 1 shows the arrangement of the parts for a complete meter. Fig. 2 is a simplified diagram of the connections when the switch is thrown to the right and Fig. 3 is a similar diagram when the switch is thrown to the left.

Referring to Figure 1.

1 is a battery of dry cells; 2 an interrupter and 3 an induction coil in which the heavy line represents the primary winding and the lighter line the secondary winding; 4 is a battery switch; 5 and 6 are variable resistance rheostats. 13 is a detector, being in this particular case in the form of a telephone receiver. X, P and Y are binding posts from which connecting leads may be run to earth electrodes as XE, PE and YE. 14 is a three-pole, double-throw switch.

The rheostat 5 is constructed by winding a bare resistance wire on an insulating core and disposing the core in an arc of a circle about the shaft 7. A movable arm 8 is placed on the shaft 7 so that it contacts with the various turns of the resistance winding as it is revolved about the center of 7. The rheostat is wound with a wire of uniform resistance and with equal spacing between adjacent turns so that the amount of resistance between either end of the rheostat and the point of contact of the arm 8 is always directly proportional to the number of degrees through which the arm 8 has moved. Associated with the rheostat 5 is a scale 9 which is divided into one hundred equal parts or multiples thereof. A pointer attached to the arm 8 moves over the scale, the scale being so placed with respect to the rheostat that when the arm 8 is so positioned that there is no resistance in circuit it points at zero on the scale and when it has traveled to the other end of the rheostat it points to one hundred (100) on the scale. The rheostat 6 is similar to 5 and, in the preferred form of my invention, the total amount of resistance in each rheostat is the same. The scale 10 is also identical with scale 9 and the relation of the scale 10 to rheostat 6 is the same as the relation of scale 9 to rheostat 5. 11 is a fixed resistance, portions of which may be shunted out by means of a multiplier switch as 12 or the multiplier may be arranged as shown in Fig. 2. Each contact point of the switch 12 is marked to indicate the multiplying constant corresponding to that particular point as for instance One, Two and Ten, Fig. 2.

The various elements are connected in such a way as to constitute a zero balancing bridge, irrespective of which way the switch 14 is thrown, the basic theory of each bridge being similar to that of the well-known Wheatstone and Kohlrausch bridges.

When the switch is thrown to the right the connections are as shown by Fig. 2. The bridge has four arms namely, A, B, C, and D, which consist respectively of the resistances 5, 6, the multiplier resistance and whatever resistance is connected between the binding posts X and Y. When the bridge is balanced there will be zero current in the detector 13 and the bridge is always balanced when the following relation exists between the various arms namely, A is to B as C is to D.

When the switch is thrown to the left a bridge is formed which is shown, in a simplified form, in Fig. 3. The bridge arm E consists of that portion of rheostat 5 lying between the zero end of the resistance and the point where the sliding contact 8 contacts with the resistance 5 and bridge arm F consists of the remaining portion of resistance 5. Bridge arm G consists of a resistance composed of the earth surrounding the electrode XE and the bridge arm H consists of the earth surrounding the electrode YE. A third connection is made to the earth by means of the electrode PE. The bridge will be balanced when E is to F as G is to H. It will be seen that the bridge balances when that portion of resistance 5 lying between zero and the point of contact of the sliding contact 8, bears the same relation to the total resistance between the points zero and 100, as the resistance of the electrode XE bears to the total resistance of the two electrodes XE and YE in series. Thus it is seen that if the bridge balances with the sliding contact 8 at point 25 of the scale, then the resistance of XE is 25% of the resistance of XE plus YE. The resistance of PE cannot be a factor in the balance since there is no current in PE when the bridge is balanced.

It will now be apparent that if the switch is thrown to the right, Fig. 2, and pointer 8 is placed upon 100 the meter will measure, and indicate on scale 10, the total resistance of XE and YE in series. It is also apparent that when the switch is thrown to the left, Fig. 3, and the bridge is balanced by adjusting pointer 8, that pointer 8 will then indicate the percentage which electrode XE is of the total resistance of XE and YE in series and if we multiply, manually, the value obtained from scale 10 by the percentage obtained from scale 9, the result will be the resistance of electrode XE.

Referring again to Fig. 2. Assume the values of the respective resistances to be as indicated and assume further that when the switch is thrown to the left (Fig. 3) the bridge balances with pointer 8 indicating 25, as shown by the dotted line. Now, if pointer 8 is left in this position and the switch is then thrown to the right (Fig. 2) the bridge will balance when pointer 15 indicates 25 on scale 10 or, in other words, the indication on scale 10 corresponds to the resistance of the electrode XE, the necessary multiplication having been performed by the meter. As will be noted the relation of the respective arms is, as before, A is to B as C is to D.

In the specification and claims the resistance of the electrode XE is to be considered as the total resistance which the earth would afford to a flow of current away from the electrode and into the earth, if the electrodes XE and YE were placed at an infinite distance from each other. The resistance afforded by the earth surrounding an electrode decreases substantially in proportion to the square of the radius of a hemisphere surrouding an electrode and except in exceptional cases, a hemisphere surrounding an electrode and having a radius of fifty feet will include all of the earth resistance which is readily measurable and for ordinary commercial measurements the radius may be reduced to twenty-five feet or even less.

The resistance which is measured by the meter herein described is, in every case, proportional to the total resistance of the circuit connected between the binding posts X and Y. This includes, in addition to earth resistance as specified in the proceeding paragraph, the resistance of the leads connecting the binding posts to the electrodes, a certain amount of resistance in the electrode metal itself and the surface contact resistance between the metal electrodes and the earth. For all practical purposes the last two of these resistances are negligible, but in any case may be considered as part of the electrode resistance since they are always definitely related to a given electrode. When making accurate measurements the resistance of the connecting leads may be determined and allowed for.

Assume XE to be an earth electrode the resistance of which it is desired to measure. It is first necessary to provide a reference electrode as YE which should be located at least fifty feet (50') from XE and connected to binding post Y. A third electrode or probe PE is inserted in the ground preferably at a point not less than twenty-five feet (25') from each of the electrodes XE and YE. This is connected to binding post P. The battery switch 4 is closed, the switch 14 thrown to the left and the rheostat 5 is adjusted until the detector 13 is silent. Without changing the setting of 5, switch 14 is now thrown to the right and rheostat 6 is adjusted until the receiver 13 is silent. The pointer on arm 15 will now indicate on scale 10 the resistance in ohms of electrode XE, providing the multiplier switch 12 is on contact pin One. If the multiplier switch is on any other multiplier than One the reading on 10 must be multiplied by that multiplier.

Resistance 5, 6 and 11 may be of any ohmage but the resistances 5 and 6 should preferably be of about the same resistance as the average resistance which the meter is expected to measure. It is not necessary that resistances 5 and 6 be of the same value but when they are of the same value the full scale value of scale 10 will be the same as the resistance in arm C, which is a desirable feature from a manufacturing viewpoint. The total ohmage of resistance 11 and the parts of this total ohmage which will be connected to the various multiplier points, will be dictated by the ohmage of rheostats 5 and 6 and the multiplying constants which it is desired to have for any particular meter.

If 5 and 6 are each 100 ohms then the resistance connected to multiplier One will be 100 ohms, that connected to point Two will be 200 ohms and that connected to point Ten, 1000 ohms. On the other hand if rheostat 5 be of only 50 ohms then the resistances for the various points would have only one-half the foregoing values.

A satisfactory meter for measuring the resistance of earth electrodes varying in value from a few ohms to as much as 5000 ohms may be constructed by selecting a value of 100 ohms for each of the resistances 5 and 6. The multiplier switch 12 may be arranged to place in circuit, in arm C, resistances of the following values namely, 1, 2, 5, 10, 20, 50, 100, 200, 500, 1000, 2000, and 5000 ohms. The resistances 5 and 6 being equal, the full scale reading for scale 10 will be the same as the amount of the resistance placed in circuit by the multiplier switch. The various contact points on the multiplier switch may be marked with both the multiplying constant and the full scale value.

It will be observed that this meter has no moving parts unless the diaphragm of the receiver 13 or the armature of the interrupter 2 are considered as such and the entire meter is readily housed in a carrying case of little more than 150 cubic inches and of about six pounds in weight. As the current is small the switch may be of the telephone cam type which is both small, light and easily mounted.

It will be seen that the scale 9 is in no way essential so far as obtaining the resistance of electrode XE is concerned but it is convenient to have the scale because it indicates, in percentage, the relation between the individual resistances of the electrodes XE and YE and the resistance of the two in series which information is sometimes of value. For instance, the accuracy with which readings may be made depends somewhat upon the ratio of XE to YE, the best conditions prevailing when the two values are substantially equal.

The two rheostats 5 and 6 may be arranged concentrically either with one above the other or one outside the other the arms 8 and 15 revolving on the same center. This makes it possible to use a single scale for both rheostats. Another feasible arrangement is to construct each rheostat to occupy a semicircle and then place them back to back thus making one complete circle of the two scales.

Where a high degree of accuracy is desired the rheostat may be of the compound type wherein one portion of a rheostat is used for obtaining a rough adjustment and a second portion is used for obtaining a final and more accurate adjustment. It is even possible to substitute ordinary decade resistance boxes for either or both of the rheostats. So far as this feature is concerned, it is only essential, for the purposes of this invention, that one of the arms, as A, be composed of an adjustable resistance and that another of the arms, as B, be composed of an adjustable resistance having indicating means for indicating the amount of resistance in the arm. Any form of variable resistance or indicating means suitable for the purpose may be used.

While the usefulness of the meter is considerably enhanced by the use of uniform scales divided into one hundred equal parts or multiples thereof, it is not necessary that uniform scales be used or that they be divided into one hundred parts. The scale must be calibrated to correspond to the amount of resistance which is cut in or out of the corresponding rheostat. If the rheostat has uniform resistance per turn and the turns are equally spaced then the scale will be uniform. However, when meters are designed for measuring electrodes of a specific character it may be found desirable to use rheostats in which the resistance per turn is not uniform but on the other hand, increases from one end of the rheostat to the other either gradually or by steps. Of course, the scale would have to be calibrated to correspond with the rheostat.

It is to be understood that detector 13 may be connected to the points AC and BD and the power supply connected to the points AB and CD, that is, the detector and the power circuits are interchangeable as to location in the bridge, this being a feature common to all bridges of this type. It is also to be understood that the bridge may be arranged with the earth electrodes in arm C and the multiplier in arm D in which case, however, the resistances in the multiplier arm would be of other values.

While I have shown and described one embodiment of my invention in accordance with the patent statutes, it will be understood that my invention is capable of embodiment in a variety of forms of apparatus and that I am not limited to the specific arrangement or structural parts shown and described, but that the scope of invention is to be gauged by the accompanying claims taken in connection with the state of the prior art.

What I claim is:—

1. A zero balancing bridge for measuring the resistance of an earth electrode which includes four bridge arms as A, B, C and D; A and B each containing a rheostat, having a movable contact, C containing a known resistance and D containing two binding posts;

a source of electric potential connected between the junction of arms A and C and the junction of arms B and D and a zero current detector connected between the junction of arms A and B and the junction of arms C and D; a graduated scale associated with the rheostat in the arm B and a double-throw switch so connected that when thrown in one direction the connections of the bridge are as stated above and when thrown in the other direction the rheostat of arm A will have its two ends connected to the two binding posts, the source of electric potential will be connected to the two binding posts and the zero detector will be connected between the movable contact of the rheostat in arm A and a third binding post.

2. An electrical system for measuring the unknown resistance value of an earth electrode, which includes two variable resistances, a plurality of standard resistance, means for connecting anyone of said standard resistances in circuit with said variable resistances, means for connecting, including circuit arrangements, the resistance of the earth electrode in a Wheatstone bridge arrangement with said variable resistances and the selected one of said standard resistances, means for supplying current to the Wheatstone bridge so formed, means for detecting the balanced state of the Wheatstone bridge so formed; means for connecting, including circuit arrangement, one end of one of the variable resistances to the electrode to be measured and for connecting the other end of the variable resistance to a second electrode and for connecting the source of current to the two last mentioned electrodes and for connecting said detecting means to the moving contact of the variable resistance and to a third electrode.

3. An electrical measuring circuit which includes a source of electricity, a balance detector, a variable resistance A, divided into two resistances E and F, a variable resistance B, a fixed resistance C and two earth electrodes X and Y connected in series, all except resistance F, connected to form a Wheatstone bridge arrangement for measuring the resistance of electrodes X and Y in series; the variable resistance A being so adjusted that E is to F as the resistance of X is to the resistance of Y.

4. In a system for measuring the resistance of an electrode X, the combination with the electrode X of a second electrode Y, a third electrode P, a source of current, a zero current detector, a variable resistance A, a variable resistance B, a fixed resistance C, inter-connecting electrical conductors and switching mechanism operatable to so connect the before mentioned members in such fashion that absence of current in the detector will indicate that the variable resisance A has been divided into two parts having the same relation to each other as the resistance of electrode X has to electrode Y and also operatable to connect the parts in such fashion that absence of current in the detector will indicate that the variable resistance B has been adjusted to the same value as the resistance of electrode X.

In testimony whereof I have signed my name to this specification.

STEPHEN W. BORDEN.